Sept. 22, 1925.
E. A. WATKINS
REAMER AND SHAPER
Filed June 30, 1924
1,554,669
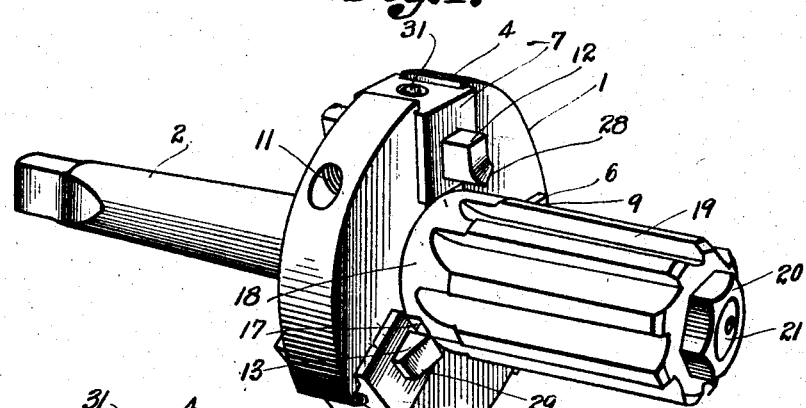
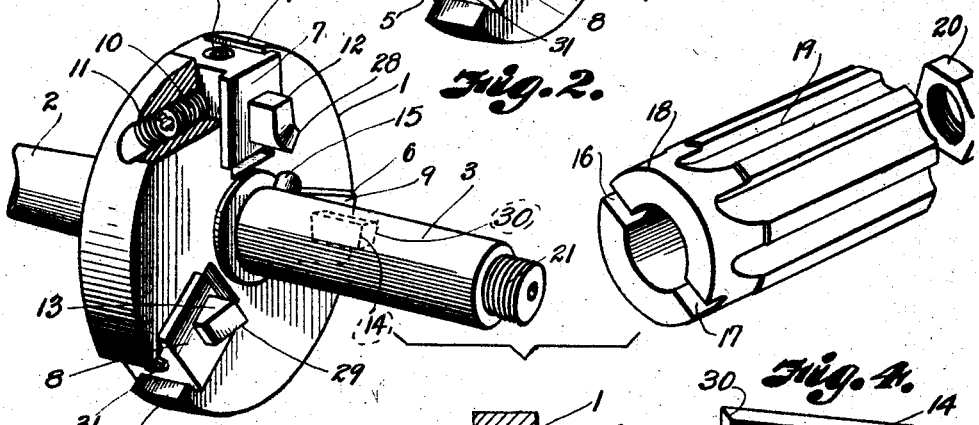
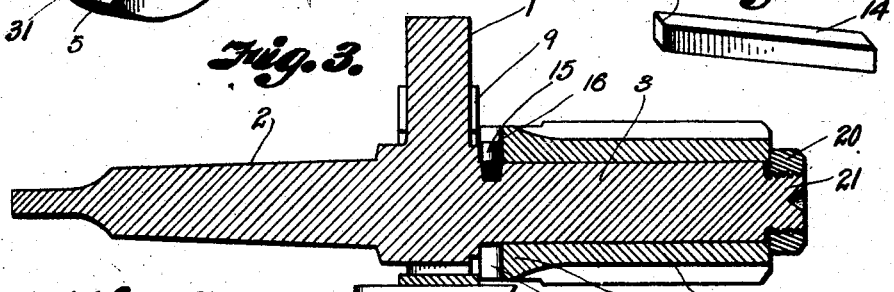
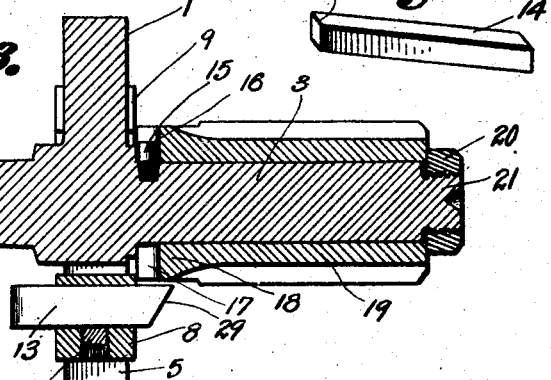
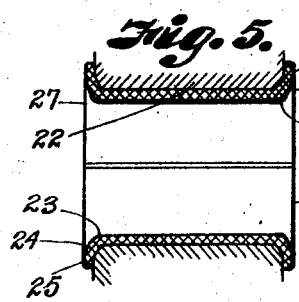
INVENTOR
*Everette A. Watkins.*
BY
*Arthur C. Brown*
ATTORNEY Patented Sept. 22, 1925.

1,554,669

UNITED STATES PATENT OFFICE.

EVERETTE A. WATKINS, OF WICHITA, KANSAS, ASSIGNOR TO THE WATKINS MANUFACTURING COMPANY, OF WICHITA, KANSAS, A CORPORATION OF KANSAS.

REAMER AND SHAPER.

Application filed June 30, 1924. Serial No. 723,188.

*To all whom it may concern:*

Be it known that I, EVERETTE A. WATKINS, a citizen of the United States, residing at Wichita, in the county of Sedgwick and State of Kansas, have invented certain new and useful Improvements in Reamers and Shapers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a reamer and shaper particularly designed for babbitted bearings and the primary object of the invention is to provide a tool which will ream and shape the bearing at a single operation.

The invention will be understood by reference to the following description in connection with the accompanying drawings, in which Fig. 1 is a perspective view of a reamer constructed in accordance with my invention.

Fig. 2 is a disassociated perspective view of the reaming element disconnected from the arbor and head.

Fig. 3 is a longitudinal sectional view through the tool.

Fig. 4 is a perspective view of one of the cutting shapers, and

Fig. 5 is a sectional view through the bearing after it has been formed.

In carrying out my invention, I prefer to provide a cylindrical head 1, a shank 2 and an arbor 3 of a single piece, the head being designed to carry radially adjustable cutters, the shank 2 is a taper shank to be received in the head stock or similar member of the machine which is to turn it and the arbor 3 carries the reaming members.

The head 1 is provided with a plurality of radial slots or recesses 4, 5, and 6 to receive radially adjustable blocks 7, 8 and 9 which may be fastened in any radially adjusted position by clamping screws, for example, similar to the one designated 10 in Fig. 2, there being a clamping screw 10 for each block, each clamping screw passing into the block through a tangential threaded opening 11.

The blocks carry cutting and forming tools 12, 13 and 14 respectively. The arbor 3 carries a stud or pin 15 adapted to be engaged by either of the transverse notches 16 or 17 in the base 18 of the reamer sleeve or tool 19 so that the member 19 will be held against rotation with respect to the arbor. The member 19 will be held against longitudinal movement with respect to the arbor by a lock nut 20 which engages the threaded extension 21 on the outer end of the arbor. The reamer element or sleeve 19 is removable to be interchanged with a different sized reamer as is well understood. The reamer will ream the bearing 22 to the desired size and when the cutters come into play the tool 12 will cut and form the portion 23 of the bearing.

The tool 13 will form the portion 24 of the bearing and the tool 14 will form the portion 25 of the bearing so that the reaming and shaping tool can complete the formation of the bearing at a single operation, that is form one end 26. Then the tool will be inserted from the opposite end and form the end 27. In this manner a true set of bearings may be provided for any motor vehicle because after the reamer and shaper has once been set, it will duplicate the work as many times as is necessary. This method materially reduces the cost of reaming and forming the bearing. The cutter 12 consists of a shank with a vertical offset sharp lip 28. The cutter 13 has a bevelled end 29 inclined in a plane extending from the periphery upon the head to the axis of the arbor and the tool 14 has an end 30 inclined at right angles to the end 29 as shown in Fig. 2.

It is obvious that different sized bearings may be reamed and shaped by providing different diameters of reamers and adjusting the blocks 4, 5 and 6. The shank obviously can be clamped in a head stock or any other suitable jaw which is adapted to rotate the tool, so I have therefore not shown any particular mechanism for holding it.

Each tool may be held in its block by a screw plug 31 as clearly shown in Figs. 1, 2 and 3.

What I claim and desire to secure by Letters Patent is:—

1. A reamer comprising a shank, an arbor, a head between the shank and the arbor, a reaming tool removably sleeved on the arbor held against longitudinal and rotative movement with respect to the arbor, a cutting tool having an offset cutting edge adjacent to the sleeve, another cutting tool having an edge inclined toward the axis of the arbor, and another cutting tool having an inclined face at right angles to the cutting edge of the second named cutting tool, all of said tools being mounted for radial adjustment on the head.

2. A reamer comprising a shank, an arbor, a disk-shaped head integrally connecting the arbor to the shank, a lateral projection at the base of the arbor, a threaded portion on the free end of the arbor, a reaming tool removably sleeved on the arbor having a notch for engaging the projection so that the reaming tool will be held against rotative movement with respect to the arbor, a nut on the threaded end of the arbor for resisting longitudinal movement of the reaming tool, a cutting tool having an offset cutting edge adjacent to the sleeve, another cutting tool having an edge inclined toward the axis of the arbor, and another cutting tool having an inclined face at right angles to the cutting edge of the second named cutting tool.

3. A reamer comprising a shank, an arbor, a head between the shank and the arbor, a reaming tool sleeved on the arbor, means for preventing longitudinal movement of the sleeve with respect to the arbor, means for preventing rotative movement of the sleeve with respect to the arbor and cutting tools on the head, one of the cutting tools having an offset cutting edge adjacent to the sleeve, another tool having an edge inclined in a plane extending from the point adjacent to the periphery of the head to the axis of the arbor and another cutting tool having an inclined face at right angles to the inclined portion of the second mentioned tool.

4. A reamer comprising a shank, an arbor, a disk-shaped head integrally connecting the arbor to the shank, a lateral projection at the base of the arbor, a threaded portion on the free end of the arbor, a reaming tool removably sleeved on the arbor having a notch for engaging the projection so that the reaming tool will be held against rotative movement with respect to the arbor, a nut on the threaded end of the arbor for resisting longitudinal movement of the reaming tool, a cutting tool having an offset cutting edge adjacent to the sleeve, another cutting tool having an edge inclined toward the axis of the arbor, and another cutting tool having an inclined face at right angles to the cutting edge of the second named cutting tool, all of said tools being mounted for radial adjustment on the head.

5. A reamer comprising a shank, an arbor, a head between the shank and the arbor, a reaming tool on the arbor mounted against rotative or longitudinal movements, cutting tools carried by the head, each cutting tool having an edge disposed at an angle different to the angle of the cutting edge of the remaining tools, the tools being grouped about the axis of the arbor, and each tool being mounted for longitudinal and radial adjustment.

In testimony whereof I affix my signature.

EVERETTE A. WATKINS.